(No Model.)
W. P. ADAMS.
NON-CONDUCTING FABRIC.
No. 332,371. Patented Dec. 15, 1885.
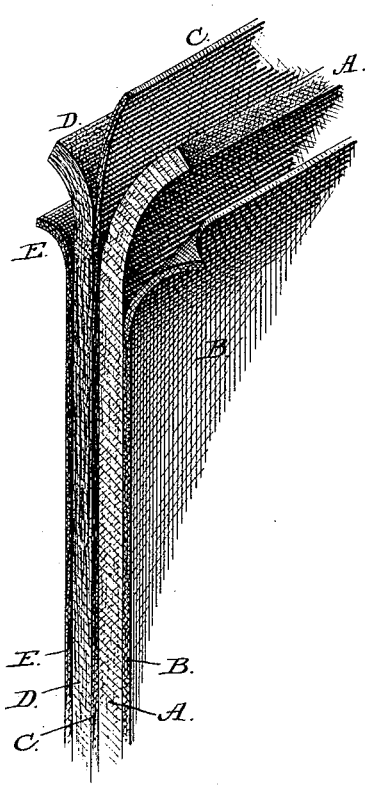
Attest:
John A. Ellis
A. B. Moore
Inventor:
William P. Adams
By David A. Burr
Atty.

UNITED STATES PATENT OFFICE.

WILLIAM P. ADAMS, OF BROOKLYN, NEW YORK.

NON-CONDUCTING FABRIC.

SPECIFICATION forming part of Letters Patent No. 332,371, dated December 15, 1885.

Application filed June 16, 1884. Serial No. 135,060. (No model.)

*To all whom it may concern:*

Be it known that I, WILLIAM P. ADAMS, of Brooklyn, in the county of Kings and State of New York, have invented a new and useful Improvement in Non-Conducting Fabrics; and I do hereby declare that the following is a full and exact description thereof, reference being had to the accompanying drawing, and to the letters of reference marked thereon, making a part of this specification.

My invention relates to a non-conducting fabric, and has for its object to provide a compound fabric to be employed for the protection of the face, hands, and body of metal-founders and other workers in hot or molten metal.

It consists in a compound fabric composed of a layer of asbestus felt, lined or faced on its one side with a fire-proof cloth and upon its opposite side with strong canvas, and in the combination, with this compound fabric, of a layer of woolen or other felt, superimposed upon the canvas, and itself covered by a facing or lining of canvas or other suitable woven fabric. The two layers of canvas or cloth are preferably rendered fire-proof by treatment with a solution of tungstate of soda, or of alum, or other equivalent chemicals. This compound fabric, when made up into mittens, will enable the wearer to handle red-hot iron with impunity, and as a mask or covering for the face and as an apron covering the body will enable the wearer to approach the hottest furnace without suffering from the effects of the exposure to its heat.

The accompanying drawing is a detail sectional view of my compound non-conducting fabric. Said fabric consists of a layer, A, of asbestus felt, overlaid exteriorly with a facing, B, of strong asbestus or fire-proof cloth. The layer of asbestus felt A is covered by a lining or backing of strong pliable canvas, C, or of burlap or other equivalent cloth, which, by preference, has been previously rendered fire-proof by saturation in a strong solution of tungstate of soda or its equivalent. This canvas backing serves to give the proper strength to the compound fabric. Upon the canvas backing C a layer of close yet pliable felt, D, of any suitable description, but preferably of wool, is laid, over which is placed a facing or durable canvas, E, or other suitable cloth, which is also preferably rendered fire-proof by treatment with tungstate of soda or its equivalent. These several layers thus superimposed in the order named are basted together, or quilted, so as to unite them in an integral fabric.

The thickness of the several layers of the fabric may be varied to suit the different articles of apparel to be manufactured therefrom and the special requirements therefor, and for some purposes—such as the manufacture of masks for the use of cooks—the layer of wool felt may be omitted.

I am aware that a fire-proof fabric has been manufactured consisting of a sheet of woven asbestus and a pliable backing of canvas; but for handling hot iron and similar uses the woven asbestus, if made of a proper thickness to afford adequate protection to the hand, becomes too stiff and unyielding for use in manufacturing gloves, mittens, or in the handling of comparatively small objects.

I claim as my invention—

A compound flexible fire-proof fabric composed of a layer of asbestus felt faced outwardly with a fire-proof cloth, and lined on the inner side with canvas overlaid with wool felt protected by an outer covering of textile material, substantially in the manner and for the purpose herein set forth.

In testimony whereof I have signed my name to this specification in the presence of two subscribing witnesses.

WM. P. ADAMS.

Witnesses:
EDWIN H. JOSE,
EMMA E. JOSE.